United States Patent [19]
Cantoni

[11] 4,354,762
[45] Oct. 19, 1982

[54] EMULSIFYING ASSEMBLY

[75] Inventor: Angelo Cantoni, Rome, Italy

[73] Assignee: Solar 77 S.p.A., Rome, Italy

[21] Appl. No.: 135,081

[22] Filed: Mar. 28, 1980

[30] Foreign Application Priority Data

Mar. 30, 1979 [IT] Italy .............................. 48549 A/79
Jul. 18, 1979 [IT] Italy .............................. 24448 A/79

[51] Int. Cl.³ ........................ B01F 5/06; G05D 11/00
[52] U.S. Cl. .................................. 366/160; 137/513;
366/176; 366/177; 366/182; 366/340
[58] Field of Search ............... 366/152, 134, 160, 162,
366/176, 178, 182, 336, 340, 177; 137/896, 114,
513

[56] References Cited
U.S. PATENT DOCUMENTS 1,524,257  1/1925  Kensig ................................. 137/513
2,178,901  11/1939  Webster ............................... 137/513
4,081,863  3/1978  Rees ..................................... 366/176

Primary Examiner—Philip R. Coe
Assistant Examiner—Timothy F. Simone
Attorney, Agent, or Firm—Karl F. Ross

[57] ABSTRACT

An emulsifying assembly for immiscible liquids comprises a metering-mixing device and an emulsifying device coupled thereto. The metering-mixing device includes two supply ducts for the liquids to be mixed and an output duct for the formed mixture, the ratio of the two liquids being held constant by an integral shutter unit effective to control the passage cross-section of the fluid supply ducts. The emulsifying device comprises a base body by which a tapering passage is formed communicating with a constant cross-section cylindrical duct leading to a plenum chamber from which the emulsified mixture is discharged.

9 Claims, 3 Drawing Figures

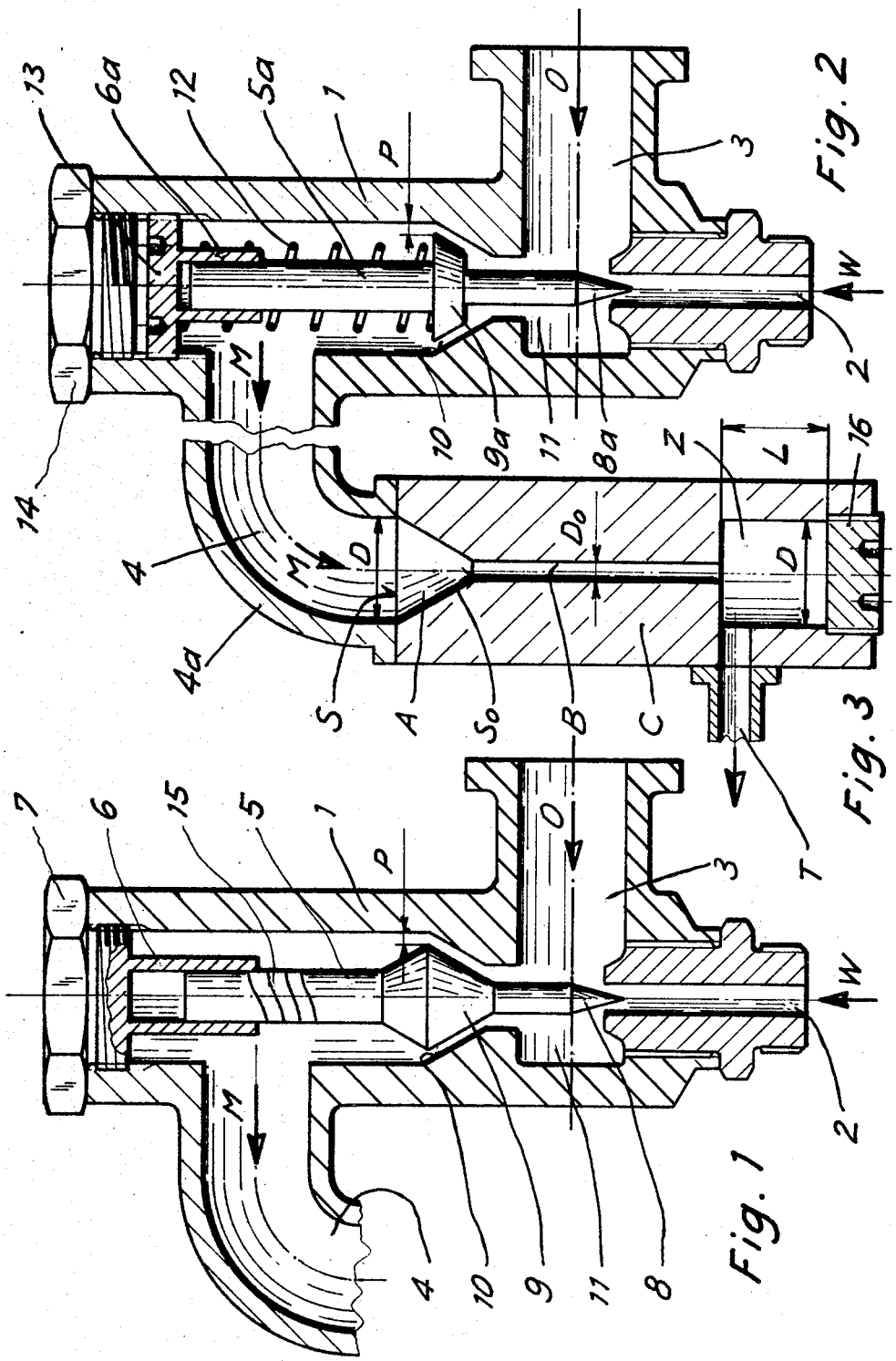

EMULSIFYING ASSEMBLY

FIELD OF THE INVENTION

The present invention relates to a device for mixing two immiscible liquids, according to predetermined rates or proportions and for emulsifying said liquids to provide very fine particles of one liquid (dispersed phase) in the other liquid (continuous phase), in order to afford a proper combustion by a conventional heat producing burner, for example in heating systems, steam-producing boilers, power stations and the like or internal-combustion engines.

BACKGROUND OF THE INVENTION

The two liquids to be emulsified are firstly automatically metered, mixed and then emulsified by causing the mixture to pass through a constant cross-section passage leading to a cylindrical plenum chamber, said chamber having a cross-section greater than the constant cross-section of the passage and such a length effective to be adjusted with side discharging, in order to obtain the desired emulsion.

As is known, the combustion of a liquid combustible, for example for heating, power producing and the like can be improved if said combustible is intimely emulsified with a certain amount of water having its particles, in the form of droplets, dispersed throughout the combustible liquid.

For example, the combustible oil and water are two immiscible liquids and, as they are emulsified, the liquid dispersed in droplets forms the so-called "dispersed phase", while the combustible liquid forms the so-called "continuous phase".

Before being emulsified, the two liquids are to be metered in the desired weight ratio, and this ratio must be maintained constant even if the required mixture (or combustible) amount changes depending on the heating the system has to produce.

With respect to the metering and mixing of the two immiscible liquids, these operation, as is known, can be carried out as follows:

(a) By using two vessels into which predetermined amounts of the two liquids are introduced and then poured in a single vessel thereby obtaining a rather homogeneous mixture.

(b) By introducing, through a cock, the desired proportion of the liquid to be dispersed: in this way, upon having set the upstream pressure, by operating the cock one can set the flow rate.

(c) By using a sophisticated and expensive method for making a gasoline-lubricating oil mixture, as used in some two-cycle motorcycle engine, which motorcycles are provided with two separate vessels, one for the lubricating oil and the other for the gasoline, respectively.

(d) By using a carburetor, as in conventional engines, to mix, according to the desired proportions, the gasoline and air; in this case, however, the mixing relates to a gas and a liquid and not two liquids.

(e) By using a nozzle, effective to spray the liquid to be dispersed into the continuous-phase liquid by the upstream pressure of this latter which pressure, if it is variable, is capable of varying the mixing ratio, or maintaining the ratio constant as the flow rate varies.

(f) By positive-displacement metering pumps (in general of the diaphragm type) effective to provide a variable flow rate, depending on the demand, for injecting the dispersed liquid.

With respect to formation of an emulsion of the two liquids, it is known to operate as follows:

(a) By using mechanical types of vibrators, effective to provide the strong mixing necessary to obtain the desired emulsion. This device comprises an ultrasonic cavitator agitating the mixture with a frequency of 20,000 Hz, thereby obtaining the dispersion.

(b) By using the so-called "impact effect" which occurs as the mixture particles, preliminarly brought to suitable speeds by exploiting a high pressure jump, (from 100 to 300 bars), are caused to impact against an obstacle.

(c) By using chemical additives (emulsifying agents) which as added to the mixture, and are effective to provide emulsifying chemical reactions.

(d) By causing at least one of said liquids to pass through a passive device located in the liquid flow-path. The liquid passes through a first tapering section, in which the pressure decreases under the Clausius-Clapeyron pressure for the liquid temperature, thereby generating bubbles. Then the liquid passes to a constant-cross-section element in which the bubbles are evolved. Due to this effect the bubbles shrink and abruptly expand, thereby providing the desired emulsion.

The known methods thereinabove described, however, are not completely satisfactory, mainly because of the great power to be expended for carrying out these methods and the complexity, high cost, and maintenance requirements associated with the apparatus.

OBJECTS OF THE INVENTION

Accordingly, it is an object of the present invention to provide a small size reliable, structurally sound and simple emulsifying assembly, effective to emulsify two or more immiscible liquids, which is able of continuously operating without requiring a separate source power or significant maintenance.

Another object of the invention is to provide an emulsifying assembly which is particularly but not exclusively effective to emulsify combustible oil and water and to be directly associated with heating systems.

Yet another object of the present invention is to provide a passive type of emulsifying assembly, so designed as to be able of operating based on the superposition of several physical phenomena, the effects of which are those of abrupt subdivision of the flows of liquids at the output of a suitably sized nozzle, thereby imparting to the jet an output power sufficient to form the new surfaces required by a fine emulsion.

Yet another object of the invention is to provide the emulsifying assembly with a metering-mixing device in which the ratio of the dispersed liquid and the continuous liquid can be mainained constant, in an automatic way, even as the mixture flow rate, required by the burner, continuously varies depending on the heat absorbed by the heating system.

SUMMARY OF THE INVENTION

These and other objects, such as will be apparent hereinafter, are achieved by an emulsifying assembly, according to the invention, comprising a metering-mixing device effective to hold constant the ratio of two liquids, as the flow-rate thereof varies, said metering-mixing device including two supply ducts and an output duct, the first supply duct being for the dispersable or dispersed liquid (water) supplied at a greater pressure thereto, the first supply duct being effective to be shut by a first shutter able of adjusting the flow-rate depending on the opening thereof in said first supply duct, said second supply duct being for the continuous liquid (combustible oil), said continuous liquid being supplied at a pressure less than the pressure of said dispersed liquid and mixed therewith, said liquid mixture being then caused to pass through a duct the passage cross-section thereof is determined by the position of a second shutter, the latter being displaced by said mixture against the biassing of elastic means, or the like, said second shutter being coupled to said first shutter adjusting the flow-rate of the liquid to be dispersed, said emulsifying assembly further comprising an emulsifying device, coupled to said mixture output duct, and including a base body where within a tapered duct is formed communicating with a constant cross-section cylindrical duct, said cylindrical duct cross-section being equal to the small cross section of said tapering duct, said constant cross-section cylindrical duct leading to a cylindrical cross-section plenum chamber, the large section of said tapering duct forming the means for supplying the fluid mixture to be emulsified, and a discharging duct, for discharging the obtained emulsion, being provided on the cylindrical surface of said plenum chamber.

BRIEF DESCRIPTION OF THE DRAWING

In the drawing:

FIG. 1 is a schematic section view of a gravity type of metering-mixing device associated with the emulsifying assembly according to the invention;

FIG. 2 is a schematic section view of the metering-mixing device including a biassing spring; and FIG. 3 is a schematic section view of the emulsifying assembly applied on the output of the metering-mixing device of FIGS. 1 or 2.

SPECIFIC DESCRIPTION

The devices illustrated in FIGS. 1 or 2 and in FIG. 3 are coupled to one another in such a way that the mixture output of the device of FIGS. 1 or 2 forms the input of the device of FIG. 3. Obviously those same devices may be constructed as a single assembly, or connected by ducts.

Referring to FIG. 1, a body 1 has a small cross-section supply duct or passage 2 effective to supply the liquid to be dispersed (water), a larger-section duct 3 for supplying the continuous liquid (combustible oil) and an output port 4 for discharging a metered mixture of the two liquids.

In the inside of said body 1 a double shutter 5 is movable and axially slides on the fixed guide 6 of the plug member 7. The valve member 5 has a first shutter 8 adjusting or controlling the flow rate in the duct 2, and a second shutter 9 controlled by the flow rate of the mixture formed by the liquids from the ducts 2 and 3 respectively.

The passage 10 for the two liquids to be mixed has a profile which, with respect to the profile of the shutter 9, is so designed that the annular passage P between the two parts gradually increases as the shutter 5 is axially upwardly moved.

Thus the profile of the shutter 8 with respect to the output of the duct 2 has to open a passage section which gradually increases in direct proportion to that of the passage P of the metered mixture.

Due to its weight, the shutter 5 acts to close the orifice of the duct 2 as the liquid passage is shut.

The liquid W to be dispersed, for example water, is supplied in the duct 2 as indicated by the arrow W, while the continuous liquid O, for example a combustible oil, is supplied through the duct 3, crossing the duct 2, as it is indicated by the arrow O.

Upon supplying said liquid O under pressure, it enters the passage 10 and causes the shutter 9 to rise depending on the required amount of liquid, for example combustible oil. Accordingly also the shutter 8, being rigid with said shutter 9, is caused to rise and the liquid W, being supplied at a pressure greater than that of the liquid O, will pass in the inside of the body 1, in the space 11, thereby crossing said liquid O.

The opening section, as determined by the position the shutter 8 assumes, determines the rate or proportion of liquid W which is mixed with said liquid O, said formed mixture M exiting from the duct 4, as it is indicated by the arrow M, to enter the emulsifier shown in FIG. 3, through the duct 4a as connected to the duct 4.

In FIG. 2, the metering-mixing device schematically illustrated is substantially equal to the metering-mixing device of FIG. 1, the main difference being that the shutter 5a is pushed towards the passages 2 and 10 by a spring 12, the latter being preloaded by a nut effective to be adjusted from the outside by removal of the plug member 14. Said shutter 5a is guided in a guide 6a by the nut 13 and is rigid with the shutter 8a for the passing through of the liquid to be dispersed W and the shutter 9a for the passing 10 of the already formed mixture M. The continuous liquid (combustible oil) O, arriving from the duct 3, under pressure, causes, as thereinabove stated, the shutter 9a to rise from the passage 10: in this way the shutter 8a opens, proportionately, the passage 2 for the liquid W.

Accordingly as the mixture amount required by the system varies, corresponding variations in the liquid O and hence different positions of the shutter 5–5a and passage sections for the liquid W, occur.

Each equilibrium position is achieved as the weight of the shutter 5, or the force of the spring 12 acting on said shutter, is equal to the action exercised in the opposite direction, this latter being given by the resultant of the pressure acting on the surface of said shutter and the entraining action due to the viscosity of the fluid sliding at contact with the surface of the shutter and the overall liquid amount passing in the passage section P.

In order to provide the shutter 5 with a greater axial stability, it may be formed with helical slots 15, adapted to be rotated by the fluid, thereby providing a stabilizing effect.

With reference to FIG. 3, the emulsifier herein illustrated comprises an elongated base body C, of cylindrical or parallelepipedal shape within which a tapering duct A is formed, of diameter D and cross-section S, said tapering duct having its small cross-section, of diameter $D_o$ and area $S_o$, in the inside of said base body; coaxially of said tapering duct A and communicating therewith, there is provided a cylindrical duct B, having a constant cross-section being equal to the small cross-section $S_o$ of said tapering duct A. The tapering or conic duct A is connected to the metering-mixing device of FIGS. 1 or 2, by means of the mixture M discharge duct 4 or a connecting duct.

The constant cross-section duct B communicates hydraulically with a cylindrical chamber Z, having a length L and a diameter D equal to the diameter of the input cross-section of said tapering duct A.

The length L of said chamber Z may be changed by forming said chamber bottom as a threaded nut 16 effective to be rotated or axially moved.

In the cylindrical surface of the plenum chamber Z discharge port T is formed whose optimal position is that closest to the exit of the duct B in the chamber Z, as it will be described in a more detailed way thereinafter.

In this device, the immiscible-liquid mixture arriving from the metering-mixing device is supplied, under pressure, to the tapering duct A. It then passes through the short duct B portion with a high speed to the plenum chamber Z where the mixture is emulsified and discharged through the port T.

By way of example, a prototype has been constructed having a starting diameter D of the tapering duct equal to 6 mm (0.196"), the same as to that of the chamber Z, and a diameter $D_o$ of the duct B equal to 0.6 mm (0.019"); accordingly the end or terminating cross-sections $S, S_o$ of said tapering duct are in a ratio of 1/100. Since the prototype has been designed for a flow rate of 15 kg/h (33.06 pounds/h) and supposed to have a volumetric mass of the mixture corresponding to 900 kg/m$^3$ (65,000 pounds/cu.ft), the fluid input speed is of about 0.16 m/s(6.299"/s), while the speed $C_o$ with which the jet enters the chamber Z is $C_o = 100$ c, that is $C_o = 100 \times 0.16$ m/s = 16 m/s(630"/s).

It should be noted that the metering-mixing assembly operates based on the superposition of several physical phenomena the effects whereof cannot be practically separated. All these phenomena, however, cooperate to drastically fractionate the nozzle output jet, thereby providing the jet with a sufficient power to form "new" surfaces as required for forming a fine emulsion.

Among these effects, are the following:

(a) The jet diffraction

This phenomenon is produced when, at the output of a nozzle, the fluid has a pressure (as related to the input pressure Pa, the volumetric mass M and the input/output speed ratio) greater than theat present in the discharging environment (plenum chamber). In the prototype, the nozzle (A+B) pressure drop would be, in the absence of losses:

$$\Delta' p = \rho C_o^2/2 = 120,884 \ P_a \approx 0.12 \ M \ P_a$$

(that is about 1.2 ate). Accordingly, if the actual $\Delta p$, between the input and the plenum chamber is greater (in the prototype it was 2 ate), the jet is then diffracted. This phenomenon generates a shower-wise advancing of the fluid stream, engaging a solid angle which increases as the $\Delta p / \Delta' p$ ratio increases. The effect of this ratio on the tapering of the nozzle output jet, however, is rather poor and accordingly this phenomenon does not appreciably change even for large $\Delta p / \Delta' p$ ratios, which are anyhow greater than 1.

The tapering assumed by the jet at the output of the nozzle would require a drastic reduction of the liquid stream speed, which is however made impossible because the high kinetic energy of said stream, and the equipressure environment present in the plenum chamber. Accordingly a stream breaking phenomenon, which is always present in the case of jet diffraction, occurs and the individual particles, formerly bound by cohesion forces, are caused to detach. A portion of the available kinetic energy is dissipated by friction against the substantially stationary fluid particles, present in the plenum chamber; the remaining portion is automatically engaged for forming new surfaces as required by the jet fractionation, i.e. for exceeding the force fields due to the molecular cohesion.

(b) The inelastic impact

The fluid stream, through fractionated and decelerated (because of the energy losses due to the above-described effects), arrives at the front wall of the plenum chamber yet provided with a certain residual speed. As the liquid particles reach this wall, they are brought to a stop and start to move rearwardly. Accordingly an impact phenomenon occurs which, though largely inelastic, is not precisely so, and therefore a portion of the kinetic energy present prior to the impact remains available for forming further surfaces, i.e. for improving the atomization of the mixture. This is analogous to the atomization which occurs in any crushing event of a physical system by impact against an obstacle, and so a number of emulsifying devices have been based on this type of process. However, in the emulsifying assembly of the invention, this phenomenon is only a collateral one and its effect, with respect to that of the above-described diffraction phenomenon, depends mainly on the distance of the front wall of the plenum chamber from the end orifice of the nozzle, in addition to the $\Delta p / \Delta' p$ ratio (indicating the stream diffraction amount) and to the statistical density and viscosity of the mixture.

Otherwise stated, upon having characterized the mixture, it would be possible, for any geometrical configurations of the nozzle, to determine the relative significance of the two effects (a) and (b) by varying the depth L of the plenum chamber. Obviously there is, with respect to the fineness of the emulsion, an optimal depth value for each value of the difference or differential $\Delta p$ between the nozzle fluid inlet pressure and that present in the plenum chamber. This optimal value may be found only experimentally.

(c) The fluid particle friction and the rotational effects in the boundary layer The friction phenomena intervene, in the process in the instant emulsifying assembly, in a number of aspects. Firstly they intervene during the diffraction phenomenon. In fact this latter phenomenon in a dense environment, and therefore the particles produced due to the fractionation of the liquid stream are in contact with practically stationary rather large massive particles, which are present in the plenum chamber. The consecuent mixing (unforeseeable by the calculations), favor the evenness of the mixture, but considerably effects the ratio of the dissipated energy to that available for the atomization. These considerations, since the described phenomena depend, overall, on several parameters (such as composition of the mixture and physical-chemical characteristics thereof, $\Delta p / \Delta' p$ ratiom emulsifier structure, etc.), each of which is responsible for several effects of physical nature, justify the adoption of the exclusively experimental research procedure-as thereinabove stated-for establishing optimal operation conditions.

The effect of friction is deleterious with respect to obtaining the desired results, though inevitable. Anyhow there is one effect of this friction which seems to be advantageous, that is the vorticity at the boundary layer which forms at the side wall of the plenum chamber.

The speed of the rearwardly directed stream, in said plenum chamber, is very low; in the above-described prototype it was about 0.16 m/s(6.3"/s). The motion, in the absence of disturbing effects, would be quite laminar; in fact, even if the liquid consists of water only, (kinematic viscosity $v=2\times10^{-3}m^2/h$ at 50° C. $-2.14\times10^{-2}$ sq. ft-), the Reynolds number Rc would be less than the critical value of 2,000–2,100, if the Reynolds number is calculated as:

$$Rc=Dc/v=6\times10^{-3}\times164\times10^{-3}/2\times10^{-3}3,600=1,771$$

However large disturbances exist, these disturbances include the presence of the direct and diffracted central stream, and the stream bending in the reduced environment of the plenum chamber. These disturbing effects create swirls, of a rotational type, which are rendered particularly strong by the anisotropic nature of the fluid.

The boundary layer adhering to the side wall of the plenum chamber is the main environment of these swirls, and the latter act to intimately mix throughout the liquid matrix the finely subdivided second liquid, thereby homogenizing the emulsion.

Obviously the boundary layer is of greater thickness in the plenum chamber portion or section thereof which faces the nozzle orifice and where, accordingly, the emulsion discharge port is provided.

As thereinabove stated, the emulsifying assembly according to the invention, of small size and considerable constructional simplicity, involves a plurality of physical phenomena whose individual contributions to the final result are practically impossible to be determined theoretically.

Surprisingly the effects of the emulsifying assembly according to the present invention occur in practice and, in order to permit the instant emulsifying assembly to be used in any cases, the following should be considered:

1- For any geometry of the emulsifying assembly, upon having established the physical-chemical properties of the mixture to be emulsified, it can be assumed that an optimal situation exists, with respect to the quality of the emulsion, corresponding to a precise pair of values for $\Delta p$ and L ($\Delta p$ being the above-illustrated pressure differential and L being the longitudinal spacing between the orifice of the nozzle B and the frontal wall of the planum chamber).

2- For proper operation it is necessary that the supply pressure $p_a$ be not less than the pressure value meeting the condition $\Delta p/\Delta' p>1$. In other words $p_a$ has to be greater than the limit value:

$$p_a=p_s+M^2/2\rho\Omega^2=p_s+0.81M^2/\rho D_o^4$$

where M is the mass flow rate and $\rho$ is the volumetric mass of the mixture, $D_o$ the diameter of the orifice of the nozzle and $p_s$ the pressure in the plenum chamber.

3- It seems to be useful, in order to improve the mixture homogeneity, to remove the mixture from the emulsifying assembly as far as possible from the inside front wall of the plenum chamber, that is at the section or portion thereof adjacent the outlet portion or section of the duct B (nozzle). The frontal wall can be also designed in such a way as to be movable, i.e. adjustable in position from the outside, for example by means of a screw or the like 16.

It should be noted that the above illustrated emulsifying device can be used, if suitably designed, for mixing all types of immiscible fluids, in addition to combustible oil and water; furthermore one can add solid material particles, suspended in one or more liquids, to the immiscible liquids. These particles will preferably have a particle size corresponding to 100–300 mesh: furthemore, to said liquids one can add also materials capable of sublimation.

The invention as described is susceptible to numerous modifications and variations, all of which fall within the purview of the instant inventive concept.

Moreover, all of the details may be, replaced with other technically equivalent elements.

I claim:

1. In an emulsifying assembly comprising a metering-mixing device effective to hold constant the ratio of two liquids, as the flow-rate thereof varies, said metering-mixing device including two supply ducts and an output duct, the first supply duct being for a dispersible or liquid supplied at a greater pressure thereto, said first supply duct being effective to be shut by a first shutter able of adjusting the flow rate depending on the opening thereof in said first supply duct, said second supply duct being for a continuous-phase liquid, said continuous-phase liquid being supplied at a pressure less than the pressure of said dispersible liquid and mixed therewith, the liquid mixture being then caused to pass through a duct the passage cross-section whereof is determined by the position of a second shutter, the latter being displaced by said mixture against the biassing of an elastic means, said second shutter being coupled to said first shutter adjusting the flow-rate of the liquid to be dispersed, the improvement wherein an emulsifying device is coupled to said mixture output duct, and comprising a base body wherewithin a tapering duct is formed communicating with a constant cross-section cylindrical duct, said cylindrical duct cross-section being equal to the small cross-section of said tapering duct, said constant cross-section cylindrical duct leading to a cylindrical cross-section plenum chamber of larger diameter than said cylindrical duct, the large section of said tapering duct forming the means for supplying the fluid mixture to be emulsified, and a discharge duct, for discharging the obtained emulsion, being provided on the cylindrical surface of said plenum chamber, said plenum chamber having a closed end spaced from the end at which said cylindrical duct opens into said plenum chamber, said closed end being formed by a wall opposite said cylindrical duct, said discharge duct communicating with said plenum chamber at the end thereof at which said cylindrical duct opens into the plenum chamber.

2. The improvement defined in claim 1 wherein said first supply duct for the dispersible liquid extends substantially vertically and said second supply duct for said continuous-phase liquid extends substantially horizontally in such a way as to cross said first supply duct at an angle of substantially 90°.

3. The improvement defined in claim 1 wherein said said first and second shutters are formed as an integral shutting unit.

4. The improvement defined in claim 3 wherein said first shutter is of needle conical shape.

5. The improvement defined in claim 1 wherein said shutting unit is provided at the top thereof, near said second shutter, with a cylindrical stem in which stabilizing helical slots are formed.

6. The improvement defined in claim 3, wherein said shutting unit is biassed by said elastic means acting with one end thereof on the top portion of said shutting unit.

7. The improvement defined in claim 1 wherein said wall of said plenum chamber is vertically movable in such a way as to be effective to be adjusted in position.

8. An emulsifying assembly for forming a dispersion of one liquid in another liquid, said assembly comprising:
- an assembly body formed with a cylindrical bore open at one end at a surface of said body;
- a plug received in said one end and formed with a tubular boss reaching away from said one end of said bore;
- a frustoconical valve seat formed at the opposite end of said bore and converging away from said one end thereof to a small diameter orifice at the narrow end of said seat;
- means forming a small-diameter passage aligned with said orifice and said bore for delivering a liquid to be dispersed to said orifice;
- a lateral fitting formed on said body and communicating with said orifice and with said passage for delivering a liquid adapted to form a continuous phase to said orifice;
- a valve member comprising a stem slidably guided in said tubular boss, a frustoconical portion attached to said stem and juxtaposed with said seat to form a passage communicating between said orifice and said bore, and a tapered portion connected to said frustoconical portion and engageable with an outlet of said passage for the liquid to be dispersed, the ratio of the cross section between said portion and said outlet and the cross section of said passage between said frustoconical portion and said seat being substantially constant;
- an arcuate duct of constant flow cross section communicating with said bore between said plug and said frustoconical valve seat for receiving the mixture of said liquids;
- a frustoconical duct of circular cross section communicating with and tapering away from said arcuate duct to a small end of said frustoconical duct;
- a narrow cylindrical duct communicating with said small end of said frustoconical duct and having a discharge nozzle remote from said small end;
- means forming a cylindrical plenum chamber of a diameter larger than that of said cylindrical duct, said nozzle opening into said plenum chamber through one end wall thereof, said plenum chamber being closed at its end remote from said nozzle by another end wall opposite said nozzle; and
- an emulsion discharge duct communicating laterally with ssaid plenum chamber proximal to said one end wall thereof.

9. The assembly defined in claim 8, further comprising a spring biasing said valve member toward a position wherein said valve member tends to close said outlet and said orifice.

* * * * *